US009143016B2

United States Patent
Constantinides et al.

(10) Patent No.: US 9,143,016 B2
(45) Date of Patent: Sep. 22, 2015

(54) USE OF DOUBLE COIL-STRIP SPRINGS FOR ELECTRIC FUEL PUMPS

(75) Inventors: Ina Constantinides, Gerlingen (DE); Paul Skljarow, Schwieberdingen (DE); Frank Kraft, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 13/607,846

(22) Filed: Sep. 10, 2012

(65) Prior Publication Data

US 2014/0070661 A1 Mar. 13, 2014

(51) Int. Cl.
*H02K 13/00* (2006.01)
*H02K 5/14* (2006.01)

(52) U.S. Cl.
CPC ........... *H02K 5/148* (2013.01); *Y10T 29/49011* (2015.01)

(58) Field of Classification Search
USPC .......... 310/242, 238–239, 244–245, 246–247
See application file for complete search history.

(56) References Cited

U.S. PATENT DOCUMENTS

| 1,743,682 | A | * | 1/1930 | Oswald | 310/247 |
| 2,956,795 | A | * | 10/1960 | Foster | 267/156 |
| 3,132,273 | A | * | 5/1964 | Pernetta | 310/246 |
| 3,133,218 | A | * | 5/1964 | Harris | 310/246 |
| 3,387,155 | A | * | 6/1968 | Krulls | 310/239 |
| 3,387,156 | A | * | 6/1968 | Elow et al. | 310/247 |
| 3,431,442 | A | * | 3/1969 | Mabuchi | 310/40 MM |
| 2009/0115266 | A1 | * | 5/2009 | Hatfield et al. | 310/50 |
| 2010/0141082 | A1 | * | 6/2010 | Harris et al. | 310/242 |
| 2014/0021824 | A1 | * | 1/2014 | Gayosso et al. | 310/227 |

FOREIGN PATENT DOCUMENTS

DE 102006047085 4/2008

* cited by examiner

*Primary Examiner* — Thanh Lam
(74) *Attorney, Agent, or Firm* — Michael Best & Friedrich LLP

(57) ABSTRACT

An electrical machine (1). The electrical machine (1) has a commutator (3), a brush (5) and a spring. In this case, the brush (5) is designed to make contact with the commutator (3). The spring is provided for the purpose of pressing the brush (5) against the commutator (3). In this case, the spring is designed as a coil spring (7) with a first coil strip (9) and a second coil strip (11).

12 Claims, 3 Drawing Sheets

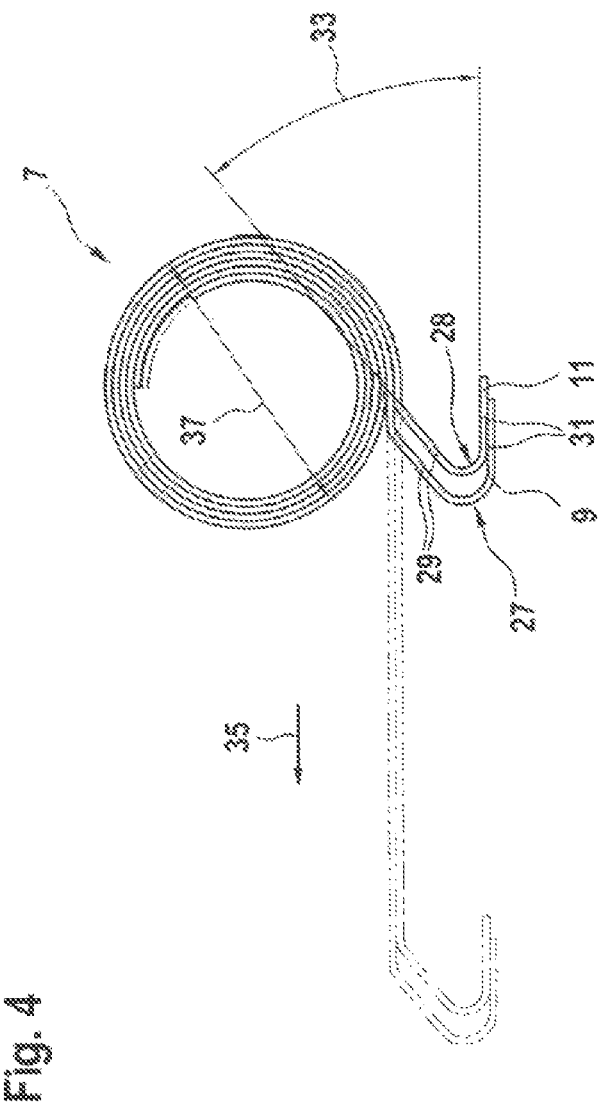

USE OF DOUBLE COIL-STRIP SPRINGS FOR ELECTRIC FUEL PUMPS

BACKGROUND OF THE INVENTION

Electric motors can be used in many fields of technology. For example, electric motors can be used for pumping liquids. In this case, the electric motors can be operated in a liquid or a liquid can flow through said electric motors.

By way of example, an electric motor can be mechanically commutated with the aid of brushes and a commutator. A corresponding electric motor is known, for example, from DE 10 2006 047 085 A1.

When the electric motor is used to pump fuel, there may be an undesired increase in the electrical resistance between the commuter and the brushes. In particular, there may be an increase in the electrical resistance when the electric motor is used with ethanol-containing fuels and/or during operation at a rated load of the electric motor which is lower than average. This increase in the electrical resistance is called the "filming effect".

SUMMARY OF THE INVENTION

There may therefore be a need for an improved electrical machine which ensures the desired performance without any significant modification measures and irrespective of the "filming effect".

Features, details and possible advantages of an apparatus according to embodiments of the invention will be discussed in detail below.

An electrical machine is presented according to a first aspect of the invention. The electrical machine has a commutator, at least one brush and at least one spring. In this case, the brush is designed to make contact with the commutator. Furthermore, the spring is designed to press the brush against the commutator. In this case, the spring has at least a first coil strip and a second coil strip.

In other words, the idea of the present invention is based on pressing one or more brushes against segments of the commutator by means of double coil-strip springs. In this way, the contact-pressure force exerted by the springs can be increased, for example in comparison to single coil-strip springs, without further modification measures being required on the electrical machine. That is to say, the contact-pressure force of the brushes on the commutator is increased and, as a result, any increase in contact resistance which may occur is overcome on account of the use of a plurality of coil strips which are used in parallel.

Furthermore, the dimensions and, in particular, the diameter of the coil spring is maintained when a second coil strip is additionally added to the first coil strip. Therefore, an installation space for the spring within the electrical machine does not need to be changed. Therefore, overall, the contact-pressure force, contact-pressing force, restoring force and/or spring force exerted by the spring can be increased without expensive modification measures being required. In addition, a spring force which is constant over the service life of the spring can be ensured by virtue of the use of coil strips or coil springs.

The electrical machine may be designed, for example, as a motor or as a generator. In particular, the electrical machine can be designed as an electric motor of a pump for conveying fuel. In this case, the electrical machine can be used, for example, in motor vehicles, in particular in fuel tanks of motor vehicles.

The electrical machine has a rotor, a stator and a commutator. The commutator can also be called a current-reversing device and can constitute a device for reversing the polarity of the electrical machine. By way of example, the commutator can be designed as a planar commutator with commutator segments and can comprise carbon.

Furthermore, the electrical machine has at least one brush which can act on commutator segments. If the electrical machine is designed as a generator, the brush can be designed as a slip ring. If, however, the electrical machine is designed as a motor, the brush can be designed in the form of a rod. In particular, a plurality of, for example two, individual brushes can be provided in one motor.

The brush can be designed, for example, as a carbon brush. Furthermore, the brush can be augmented with metal components, for example copper or silver. Furthermore, abrasive particles, for example silicon carbide and/or silicon oxide, can be provided in the brush if desired.

The brush can be arranged, for example, in a brush holder and can be attached to said brush holder. In this case, the brush is pressed against the commutator by the spring or by a plurality of springs, as a result of which an electrical circuit is closed. In this case, exactly one spring can be provided for each brush.

Wear on the brush and the commutator is controlled by virtue of the contact-pressure force of the spring. The operation of the electrical machine can be interrupted by varying the contact-pressure force. However, on account of the coil springs with two coil strips used according to the invention, the contact-pressure force remains constant over the service life of the spring.

The coil spring can also be called a coil-strip spring or "reel tape spring". In this case, the coil spring in load-free form, that is to say in its basic form, is rolled up around an axis and has an attachment element, for example a heel. The coil spring can be attached to the brush holder by means of the attachment element and then be unrolled over the length of a brush. That portion which is still rolled up lies on a surface of the brush. The brush is pressed against the commutator by virtue of the restoring force of the coil spring, that is to say by virtue of the force which would roll the spring back into its original position.

In particular, the coil spring can introduce an axial and a tangential force component into the brushes and transmit said axial and tangential forces to said brushes. The brush is pressed against the commutator by the axial force component, and smooth guidance of the brush in the brush holder is ensured by the tangential force component. The spring constant of the coil spring is very low. The spring constant is preferably approximately zero. As a result, the contact-pressure force which is exerted on the brush remains constant over the service life of the spring, irrespective of the length of the brush.

According to an exemplary embodiment of the invention, the first coil strip and the second coil strip are separate. As a result, conventional coil strips, also called sheets, can be used to produce the spring which is used in the electrical machine according to the invention. By way of example, the coil strips can comprise metals, for example sheet metal and, in particular, stainless steel, in this case.

According to a further exemplary embodiment of the invention, the first coil strip and the second coil strip are helically wound one onto the other or one into the other. By way of example, the coil strips can be close to or directly next to one another in the unrolled state and can then be rolled up. The coil strips which are inserted one into the other in this way form a coil spring which has a diameter which corresponds approximately to the diameter of the individual coil strips and which has a spring force which is greater than the spring force of the individual coil strips. The spring force of the coil spring with the two coil strips is preferably between 3 and 5 Newtons. In particular, the spring force is between 4 and 5 Newtons. The diameter of the rolled-up coil spring can be, for example, between 5.7 mm and 6.6 mm in this case.

According to a further exemplary embodiment of the invention, the first coil strip has a first thickness and the second coil strip has a second thickness. In this case, the first thickness differs from the second thickness. The thicker coil strip can be arranged, for example, on the inside and the thinner coil strip can be arranged on the outside. As an alternative, the thicker coil strip can be arranged on the outside and the thinner coil strip can be arranged on the inside. In this case, the thicker coil strip can, for example, have a thickness of approximately 0.084 to 0.094 mm. The thinner coil strip can, for example, have a thickness of approximately 0.084 to 0.089 mm. The contact-pressing force given a combination of coil strips of different thicknesses can be between 3.7 and 5.3 Newtons in this case.

According to a further exemplary embodiment of the invention, the first thickness corresponds to the second thickness. In this case, the contact-pressing force is, for example, between 4.2 and 4.4 Newtons.

According to a further exemplary embodiment of the invention, the electrical machine also has a brush holder. The brush holder can comprise plastic, for example. In particular, the brush holder can be designed as an injection-molded part. The brush holder has a guide with a first opening and a second opening. The second opening is situated opposite the first opening. In this case, the brush is arranged in the guide in such a way that the brush is in contact with the commutator by way of a first surface and with the coil spring by way of a second surface. The guide can also be called a cartridge.

According to a further exemplary embodiment of the invention, the coil spring is arranged on and attached or fixed to the brush holder. According to a further exemplary embodiment of the invention, the brush holder has a fixing element for this purpose. In this case, the fixing element can be designed, for example, as a lug, as a projection or as a recess. In this case, the first coil strip has a first attachment element and the second coil strip has a second attachment element. In this case, the attachment elements each engage with the fixing element. Both the first and the second attachment element can be designed, for example, as heels.

According to a further exemplary embodiment of the invention, the first attachment element is designed as a heel. In this case, the attachment element, that is to say the heel, has a connection region and an engagement region. In this case, the connection region connects, for example, an unrolled region of the coil-strip spring to the engagement region. The engagement region can, for example, engage around a fixing element of the brush holder. In this case, the connection region can form an angle of between 40° and 45.5° with the engagement region. Suitable selection of this angle firstly prevents the surface of the commutator being damaged and secondly prevents excessively high loading and possibly fracture of the fixing element on the brush holder.

A method for producing an above-described electrical machine is presented according to a second aspect of the invention. In this case, the method comprises the following steps: providing a commutator; providing a brush which is designed to make contact with the commutator; arranging a coil spring with a first coil strip and a second coil strip on the brush in such a way that the brush is pressed against the commutator.

BRIEF DESCRIPTION OF THE DRAWINGS

Further features and advantages of the present invention will become apparent to a person skilled in the art from the following description of exemplary embodiments, which, however, are not to be interpreted as being restrictive to the invention, with reference to the appended drawings.

FIG. 4 shows a side view of a coil spring with two coil strips for use in an electrical machine according to an exemplary embodiment of the invention.

DETAILED DESCRIPTION

Figure 1:
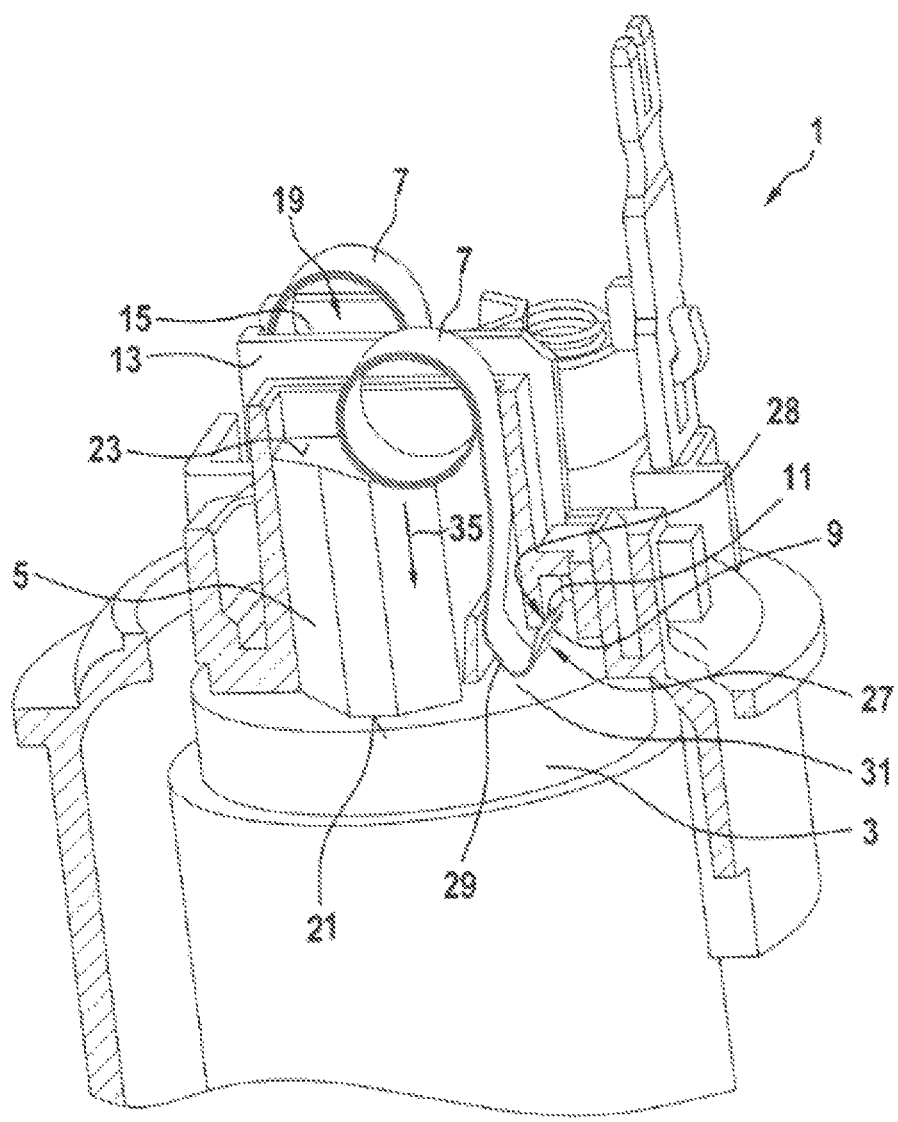
FIG. 1 shows a perspective view of a portion of the electrical machine according to an exemplary embodiment of the invention

All the figures are merely schematic illustrations of apparatuses according to the invention or of the constituent parts of said apparatuses according to exemplary embodiments of the invention. In particular, distance and relative sizes are not reproduced to scale in the figures. Corresponding elements are provided with the same reference numerals in the various figures.

FIG. 1 shows a perspective view of a portion of an electrical machine 1. The electrical machine 1 is designed as a DC motor with brushes and can be used, for example, as part of a fuel pump in a motor vehicle. As an alternative, the electrical machine 1 can also be used as a drive for fans, windshield wipers and actuators, such as seat-adjusting devices, in a motor vehicle.

The electrical machine 1 has a commutator 3 with individual commutator segments and two brushes 5 for making contact with the commutator 3. Only one of the brushes 5 is shown in the illustration in FIG. 1. The brushes 5 are arranged in a brush holder 13. The brush holder 13 is illustrated in section in FIG. 1, and therefore the entire front brush 5 is shown and the arrangement of the rear brush 5 in the brush holder is illustrated.

In this case, the brush holder 13 has a guide 15 for each brush 5. The guides 15 are arranged parallel to one another in this case and each have a first opening 17 and a second opening 19. The first opening 17 is shown in the section view of FIG. 2. Said first opening faces the surface of the commutator 3. The second opening 19 is shown in the rear region of FIG. 1 and in the plan view of FIG. 3. Said opening 19 faces a coil spring 7. That is to say, each brush 5 is in contact with a surface of the commutator 3 by way of a first surface 21 of the brush 5 through the first opening 17 in the guide 15. Furthermore, each brush 5 is in contact with a coil spring 7 by way of a second surface 23 of the brush 5 through the second opening 19 in the guide 15. The guide 15 can define or delimit the installation space of the coil spring 7 in the process.

In this case, the coil spring 7 has a first coil strip 9 and a second coil strip 11. The first coil strip 9 is rolled into the second coil strip 11 in the form of a spiral in this case. This is illustrated in FIG. 4, for example.

The contact-pressing force 35 which is exerted on the brush 5 by the coil spring 7 can be increased by virtue of using a coil spring 7 with two separate coil strips 9, 11. This can be used to overcome an increased contact resistance between the first surface 21 of the brush 5 and the surface of the commutator 3.

An increase in the contact resistance between the first surface 21 of the brush 5 and the surface of the commutator 3 can be caused by the so-called "filming effect" in this case. This occurs, for example, in the form of deposits on the surface of the commutator 3. In particular, the "filming effect" occurs when ethanol-containing fuels, for example E85, which wash around the commutator 3 and the brush 5 are used. Furthermore, the "filming effect" can occur when the electrical machine is operated at voltages which are lower than average.

The coil spring 7 exerts a higher contact-pressure force 35 on the brush 5 than conventional springs, and therefore the increased contact resistance can be overcome. The diameter 37 of the coil spring 7 is restricted by the limited installation space within the electrical machine 1. In particular, the installation space can be limited by the dimensions of the guide 15 of the brush holder 13. However, the coil spring 7 has the same diameter 37 (FIG. 4) as the conventionally used springs on account of said coil spring being designed in a helical manner from two separate coil strips 9, 11. As a result, it is not necessary to adapt or to modify the installation space for the coil spring 7 within the electrical machine 1 and in particular within the brush holder 13. In addition, the coil spring 7 with two coil strips 9, 11 guarantees a contact-pressing force 35 which is constant over the service life.

Overall, a contact-pressing force 35 which acts on the brush 5 is increased and therefore the contact resistance between the brush 5 and the commutator 3 is minimized by virtue of the use of the coil spring 7 with two coil strips 9, 11. An optimum flow rate of a pump which is driven by means of the electrical machine at any point during operation can be ensured in this way.

The thickness of the individual coil strips 9, 11 can be varied in a production related manner. Therefore, the thicknesses of the first coil strip 9 and of the second coil strip 11 can be combined such that a specific contact-pressing force 35, for example approximately 4.5 Newtons, can be achieved and a diameter 37 of approximately 6.6 mm cannot be exceeded.

The coil spring 7 also has attachment elements 27, 28 which are designed, for example, as heels. In this case, the first coil strip 9 has a first attachment element 27 and the second coil strip 11 has a separate second attachment elements 28. The first attachment element 27 and the second attachment element 28 can overlap or lie one above the other when the coil spring 7 is in the assembled or rolled-up state.

Figure 2:
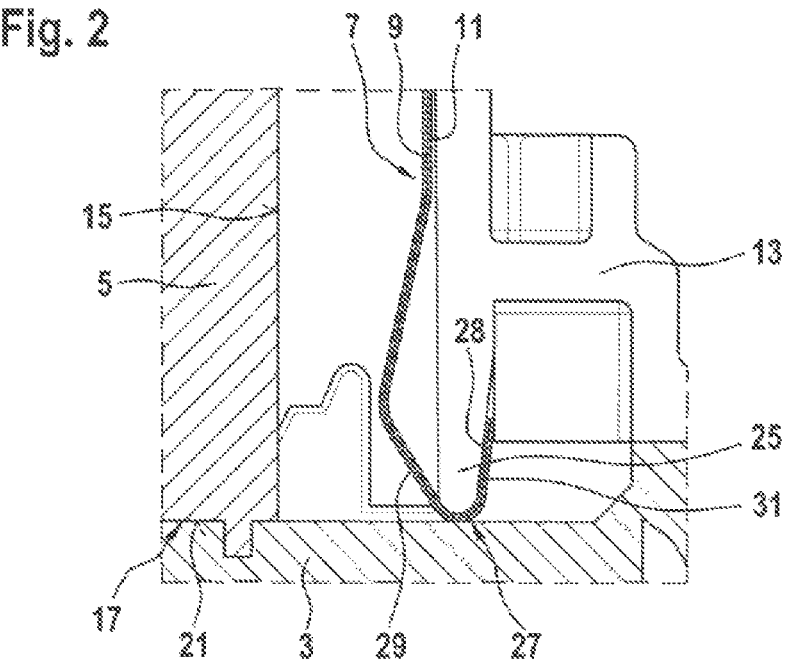
FIG. 2 shows a detail of a cross section through a brush holder of an electrical machine according to an exemplary embodiment of the invention
Figure 3:
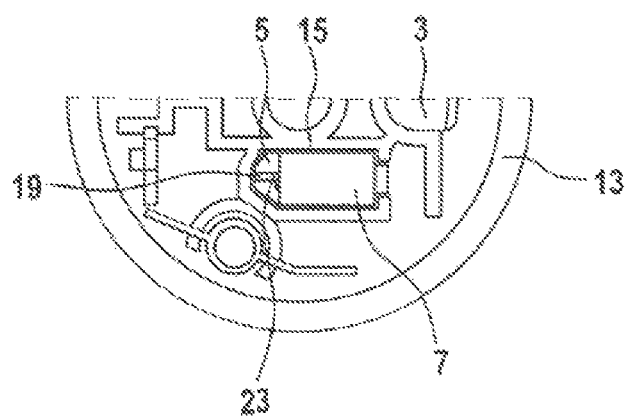
FIG. 3 shows a plan view of a portion of a brush holder of an electrical machine according to an exemplary embodiment of the invention

The attachment elements are shown, for example, in FIG. 2 and in FIG. 4. The brush holder 13 has a fixing element 25 which corresponds to the attachment elements 27, 28 and is designed, for example, as a lug. The attachment elements 27, 28 engage with the fixing element 25, and therefore a contact-pressing force 35 can be transmitted to the brushes 5 which are likewise arranged in the brush holder 13.

In order to ensure optimum attachment of the coil spring 7 and to prevent the surface of the commutator 3 from being damaged during assembly of the electrical machine 1, the attachment elements 27, 28 each have a specific curvature. In particular the first attachment element 27 has, as shown in FIG. 4, a connection region 29 and an engagement region 31, said connection region and engagement region forming an angle 33. This angle 33 is preferably between 40° and 45.5°. The second attachment element 28 likewise has a connection region 29 and an engagement region 31. Said connection region and engagement region form the same angle 33 as the connection region 29 and the engagement region 31 of the first attachment element 27.

Finally, it should be noted that expressions such as "having" or the like are not intended to rule out the possibility of further elements or steps being provided. Furthermore, the use of "one" or "a" is not intended to rule out a greater number. In addition, features described in connection with the various embodiments can be combined with one another as desired. It should also be noted that the reference symbols in the claims are not intended to be interpreted as being restrictive to the scope of the claims

What is claimed is:

1. An electrical machine (1), the electrical machine (1) having
   a commutator (3);
   a brush (5) which is designed to make contact with the commutator (3); and
   a spring for pressing the brush (5) against the commutator (3);
   characterized in that the spring is designed as a coil spring (7) with a first coil strip (9) and a second coil strip (11).

2. The electrical machine (1) according to claim 1, wherein the first coil strip (9) and the second coil strip (11) are separate.

3. The electrical machine (1) according to claim 1, wherein the first coil strip (9) and the second coil strip (11) are wound one onto the other in a spiral form.

4. The electrical machine (1) according to claim 1, wherein the first coil strip (9) has a first thickness and the second coil strip (11) has a second thickness; wherein the first thickness differs from the second thickness.

5. The electrical machine (1) according to claim 1, wherein the first coil strip (9) has a first thickness and the second coil strip (11) has a second thickness; wherein the first thickness corresponds to the second thickness.

6. The electrical machine (1) according to claim 1, further having
   a brush holder (13);
   wherein the brush holder (13) has a guide (15) with a first opening (17) and a second opening (19) which is situated opposite the first opening (17);
   wherein the brush (5) is arranged in the guide (15) in such a way that the brush (5) is in contact with the commutator (3) by way of a first surface (21) and with the coil spring (7) by way of a second surface (23).

7. The electrical machine (1) according to claim 1, wherein the coil spring (7) is arranged on and attached to the brush holder (13).

8. The electrical machine (1) according to claim 6,
   wherein the brush holder (13) has a fixing element (25);
   wherein the first coil strip (9) has a first attachment element (27) and the second coil strip (11) has a second attachment element (28);
   wherein the first attachment element (27) and the second attachment element (28) each engage with the fixing element (25).

9. The electrical machine (1) according to claim 1,
   wherein the first attachment element (27) is designed as a heel;
   wherein the first attachment element (27) has a connection region (29) and an engagement region (31);
   wherein the connection region (29) forms an angle (33) of between 40° and 45.5° with the engagement region (31).

10. A method for producing an electrical machine (1) according to claim 1, the method involving the following steps:
   providing a commutator (3);
   providing a brush (5) which is designed to make contact with the commutator (3); and
   arranging a coil spring (7) with a first coil strip (9) and a second coil strip (11) on the brush (5) in such a way that the brush (5) is pressed against the commutator (3).

11. The method according to claim 10, wherein the coil spring (7) is arranged with a spiral portion pressing upon a surface (23) of the brush (5) which is opposite a commutator-engaging surface (21) of the brush (5).

12. The electrical machine (1) according to claim 1, wherein the brush (5) includes a first surface (21) in contact with the commutator (3), and a second surface (23) opposite the first surface (21) upon which a spiral portion of the coil spring (7) presses.

* * * * *